(12) United States Patent
Carlson et al.

(10) Patent No.: US 7,788,575 B2
(45) Date of Patent: Aug. 31, 2010

(54) AUTOMATED IMAGE ANNOTATION

(75) Inventors: Gerard J. Carlson, Boise, ID (US); David Ritzenthaler, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1530 days.

(21) Appl. No.: 11/047,883

(22) Filed: Jan. 31, 2005

(65) Prior Publication Data
US 2006/0173909 A1    Aug. 3, 2006

(51) Int. Cl.
*G06F 17/40*    (2006.01)
*G06F 17/24*    (2006.01)

(52) U.S. Cl. .................. 715/230; 715/233; 715/264; 715/708

(58) Field of Classification Search .................. 715/230, 715/233, 264, 708
See application file for complete search history.

(56) References Cited

U.S. PATENT DOCUMENTS

| | | | |
|---|---|---|---|
| 6,396,537 B1 * | 5/2002 | Squilla et al. ............... | 348/239 |
| 6,826,554 B2 * | 11/2004 | Sone ............................... | 707/2 |
| 6,996,402 B2 * | 2/2006 | Logan et al. .............. | 455/456.1 |
| 7,248,285 B2 * | 7/2007 | Needham ................... | 348/207.1 |
| 2001/0015756 A1 * | 8/2001 | Wilcock et al. .............. | 348/158 |
| 2003/0020816 A1 * | 1/2003 | Hunter et al. ............. | 348/231.3 |
| 2003/0065805 A1 * | 4/2003 | Barnes, Jr. ................... | 709/231 |
| 2003/0202104 A1 * | 10/2003 | Werner ................... | 348/207.99 |
| 2004/0049734 A1 * | 3/2004 | Simske ........................ | 715/512 |
| 2004/0076345 A1 * | 4/2004 | Olszak et al. ............... | 382/309 |
| 2004/0123131 A1 * | 6/2004 | Zacks et al. ................. | 713/200 |
| 2005/0078174 A1 * | 4/2005 | Casey et al. .................... | 348/61 |

* cited by examiner

*Primary Examiner*—Stephen S Hong
*Assistant Examiner*—Wilson Tsui

(57) ABSTRACT

An automatic annotation transmission device including a memory, a processor, and a transmitter, is programmed with information related to a nearby photographic subject, and configured to transmit the information to a properly configured automatic annotation reception device. An electronic image capture device including a memory, a processor, and a receiver is configured to receive information from an automatic annotation transmission device, correlate the annotation information with one or more captured images and store the annotation information in a memory.

13 Claims, 4 Drawing Sheets

US 7,788,575 B2

AUTOMATED IMAGE ANNOTATION

FIELD OF THE INVENTION

The present invention relates generally to the field of image capture devices, and more particularly to the field of automatic annotation of still images and videos taken with image capture devices.

BACKGROUND OF THE INVENTION

Many photographers, particularly while traveling, take a large number of photographs of various objects and scenes while failing to record location, description, title, or other information about each photograph. Later, while sorting the resulting accumulation of photos it is very difficult to annotate each photograph adequately. For example, a visitor to Yellowstone National Park may return with photos of 100 or more different geysers, pools, or other geothermal features. Without careful recording of information for each photograph as it was taken, it is virtually impossible to correctly annotate each of the photographs later. Visitors to museums face a similar problem in correctly annotating the photographs they take. Some photographers attempt to solve this problem by taking extensive notes, which takes large amounts or time, or photographing the informative signs placed by the museum near each object, which takes large amounts of film or memory. In such complicated situations, it is very easy for errors to occur in the photographer's annotations.

SUMMARY OF THE INVENTION

An automatic annotation transmission device including a memory, a processor, and a transmitter, is programmed with information related to a nearby photographic subject, and configured to transmit the information to a properly configured automatic annotation reception device. An electronic image capture device including a memory, a processor, and a receiver is configured to receive information from an automatic annotation transmission device, correlate the annotation information with one or more captured images and store the annotation information in a memory.

Other aspects and advantages of the present invention will become apparent from the following detailed description, taken in conjunction with the accompanying drawings, illustrating by way of example the principles of the invention.

DETAILED DESCRIPTION

Figure 1:
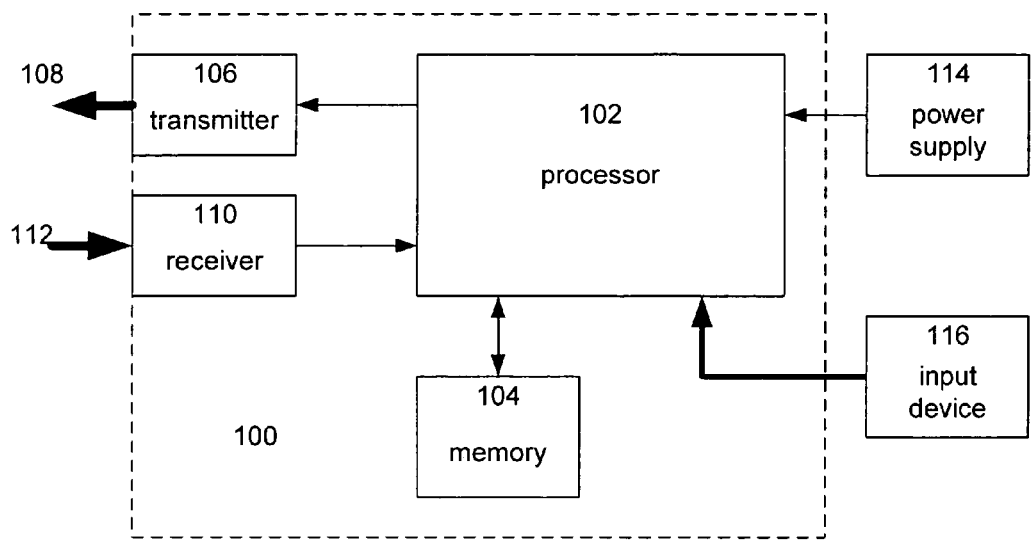
FIG. 1 is a block diagram of an example embodiment of an automatic annotation transmission device according to the present invention.

This description of the preferred embodiments is intended to be read in connection with the accompanying drawings, which are to be considered part of the entire written description of this invention. In the description, relative terms such as "lower," "upper," "horizontal," "vertical," "up," "down," "top," "bottom," "left," and "right" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected," "coupled," and "interconnected," refer to a relationship wherein structures are secured or attached to one another either directly or indirectly through intervening structures, as well as both movable or rigid attachments or relationships, unless expressly described otherwise.

FIG. 1 is a block diagram of an example embodiment of an automatic annotation transmission device according to the present invention. In this example embodiment of the present invention an automatic annotation transmission device 100 is built comprising a processor 102, electrically coupled to a memory 104, and also electrically coupled to a transmitter 106, and an optional receiver 110. In an example embodiment of the present invention, the transmitter 106 is an infrared light emitting diode (IR LED), and the optional receiver 110 is an IR receiver. The transmitter 106 emits infrared light 108 and the receiver detects infrared light 112. The processor 102 is configured to take annotation data related to a nearby photographic subject from the memory 104 and transmit the annotation data to a corresponding automatic annotation reception device through the transmitter 106. Those of skill in the art will recognize that infrared signals are only one of several possible means of transmitting and receiving information. For example, low power radio frequency (RF) transmitters and receivers may also be used within the scope of the present invention. The processor 102 is also configured to electrically couple to an input device 116 which allows a trusted user to configure the automatic annotation transmission device 100 and to change the annotation data stored in the memory 104. The automatic annotation transmission device 100 is powered by a power supply 114, which may be internal or external to the automatic annotation transmission device 100 within the scope of the present invention. Those of skill in the art will recognize that this power supply 114 may comprise a battery, a connection to an AC power outlet, or possibly a solar cell charging a battery, all within the scope of the present invention.

While some embodiments of the present invention may not include the optional receiver 110, those embodiments that do include the receiver 110, have further capabilities. For example, in some embodiments of the present invention, the receiver 110 may be used to detect signals from an automatic annotation reception device and thus trigger the transmission of the annotation data only upon reception of these signals, thus saving power over an embodiment where the annotation data is continuously transmitted. Also, some embodiments of the present invention, may require the signal to contain a password (or equivalent security information) before enabling the transmission of the annotation data. This password protection allows users to control the dissemination of the annotation data, and perhaps to charge for it if they so desire.

Those of skill in the art will recognize that a very wide variety of information may be contained within the annotation data transmitted. For example, the annotation data may contain information such as the date and time, current location, the name or title of the photographic subject or imaged object, historical information related to the location or photographic subject, and in fact any other information that the user of the automatic annotation transmission device wishes to disseminate. Further, those of skill in the art would recognize also that the annotated data may be transmitted in more than one language. Those of skill in the art will recognize also that the annotation data may be configured in a plurality of fields, with locations for time, date, location, name or title of imaged object, etc. The use of fields allows the user to configure the automatic annotation transmission device to transmit less than all of the fields of information, and also allows the user of the automatic annotation reception device to receive (or store in memory) less than all of the fields of information.

Figure 2:
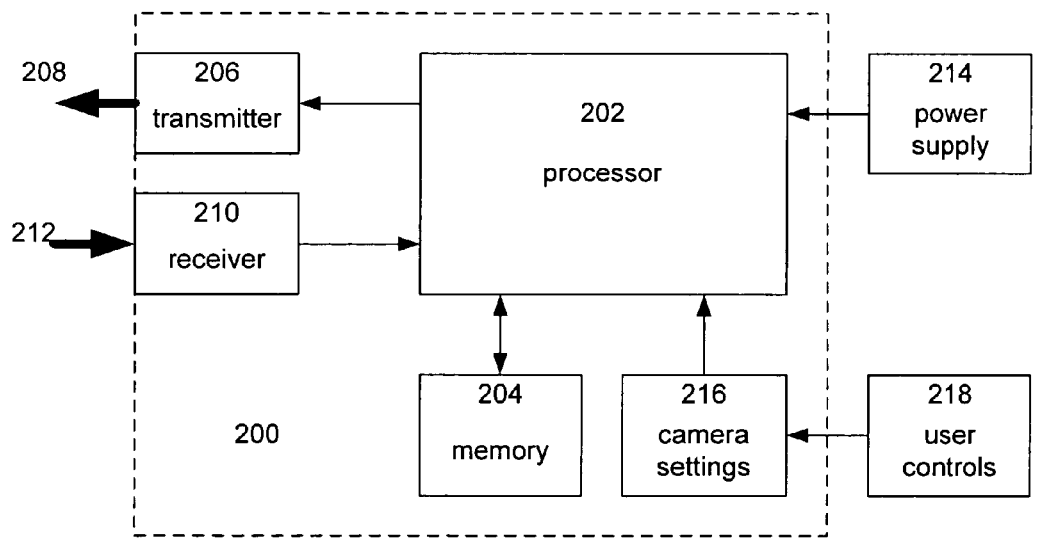
FIG. 2 is a block diagram of an example embodiment of an automatic annotation reception device according to the present invention.

FIG. 2 is a block diagram of an example embodiment of an automatic annotation reception device according to the present invention. In this example embodiment of the present invention, an automatic annotation reception device 200 is built comprising a processor 202 electrically coupled to a memory 204, a receiver 210 also electrically coupled to the processor 202, along with an optional transmitter 206 electrically coupled to the processor 202. In an example embodiment of the present invention, the optional transmitter 206 is an infrared light emitting diode (IR LED), and the receiver 210 is an IR receiver. The optional transmitter 206 emits infrared light 208 and the receiver 210 detects infrared light 212. The processor 202 is configured to receive annotation data related to a nearby photographic subject from the receiver 210 and store the annotation data in the memory 204. Those of skill in the art will recognize that infrared signals are only one of several possible means of transmitting and receiving information. For example, low power radio frequency (RF) transmitters and receivers may also be used within the scope of the present invention. The automatic annotation reception device 200 is powered by a power supply 214, which may be internal or external to the automatic annotation reception device 200 within the scope of the present invention. Those of skill in the art will recognize that this power supply 214 may comprise a battery (most likely for the situations where the automatic annotation reception device is a digital camera), a connection to an AC power outlet, or possibly a solar cell charging a battery, all within the scope of the present invention. The processor 202 also is configured to receive (in the example embodiment of a digital camera) a quantity of camera settings 216 set by one or more user controls 218. As described above, in some example embodiments of the present invention, the user may control which fields of the annotation data are received from the automatic annotation transmission device, and which fields are stored in the memory 204. All of this annotation data would be of limited use without some means of correlating the annotation data to any captured images. The processor 202 is used to correlate the annotation data received when an image is captured and to store the image and the annotation data in the memory 204.

In some example embodiments of the present invention, the automatic annotation reception device is configured to capture any available annotation data when each image is captured. Other embodiments of the present invention may only record annotation data when directed to do so by the user. Those of skill in the art will recognize that there are a very wide variety of methods of storing the annotation data, correlating the annotation data to one or more still or video images, and later parsing the annotation data. For example, in embodiments of the present invention where the annotation data includes fields, individual fields may be searched, and the resulting images may be retrieved according to the values of one or more of the fields of annotation data, such as all images taken at a certain location on a certain date.

While some embodiments of the present invention may not include the optional transmitter 206, those embodiments that do include the transmitter 206, have further capabilities. For example, in some embodiments of the present invention, the transmitter 206 may be used to send signals to an automatic annotation transmission device and thus trigger the transmission of the annotation data only upon reception of these signals, thus saving power over an embodiment where the annotation data is continuously transmitted. Also, some embodiments of the present invention, may include a password (or equivalent security information) in the transmitted signal as required by the corresponding automatic annotation transmission device before the transmission of the annotation data is enabled.

Figure 3:
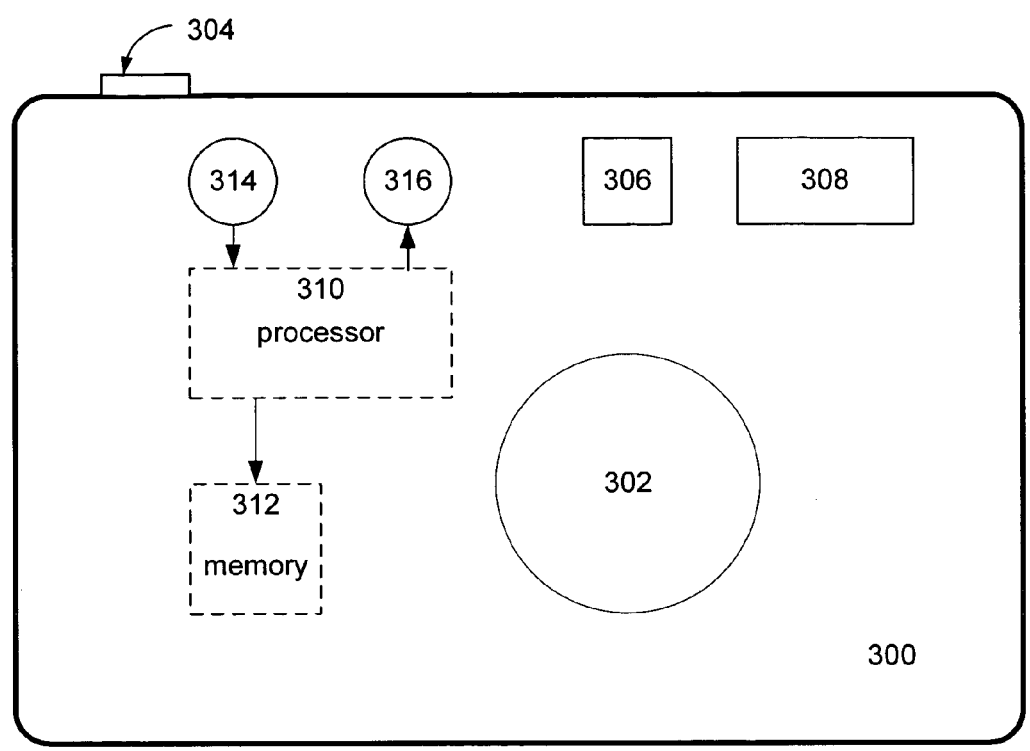
FIG. 3 is a front view of a digital camera including an example embodiment of an automatic annotation reception device according to the present invention.

FIG. 3 is a front view of a digital camera including an example embodiment of an automatic annotation reception device according to the present invention. In this example embodiment of the present invention, a digital camera 300 is built including a lens 302, a shutter button 304, a viewfinder 306, and a flash 308. Also contained within this digital camera 300 is a processor 310 which is electrically coupled to a memory 312, a receiver 314, and an optional transmitter 316. As described above, the automatic annotation reception device contained within this digital camera 300 allows the reception of annotation data from any nearby automatic annotation transmission devices, the correlation of this annotation data with images, and the storage of the images and annotation data in a memory.

Figure 4:
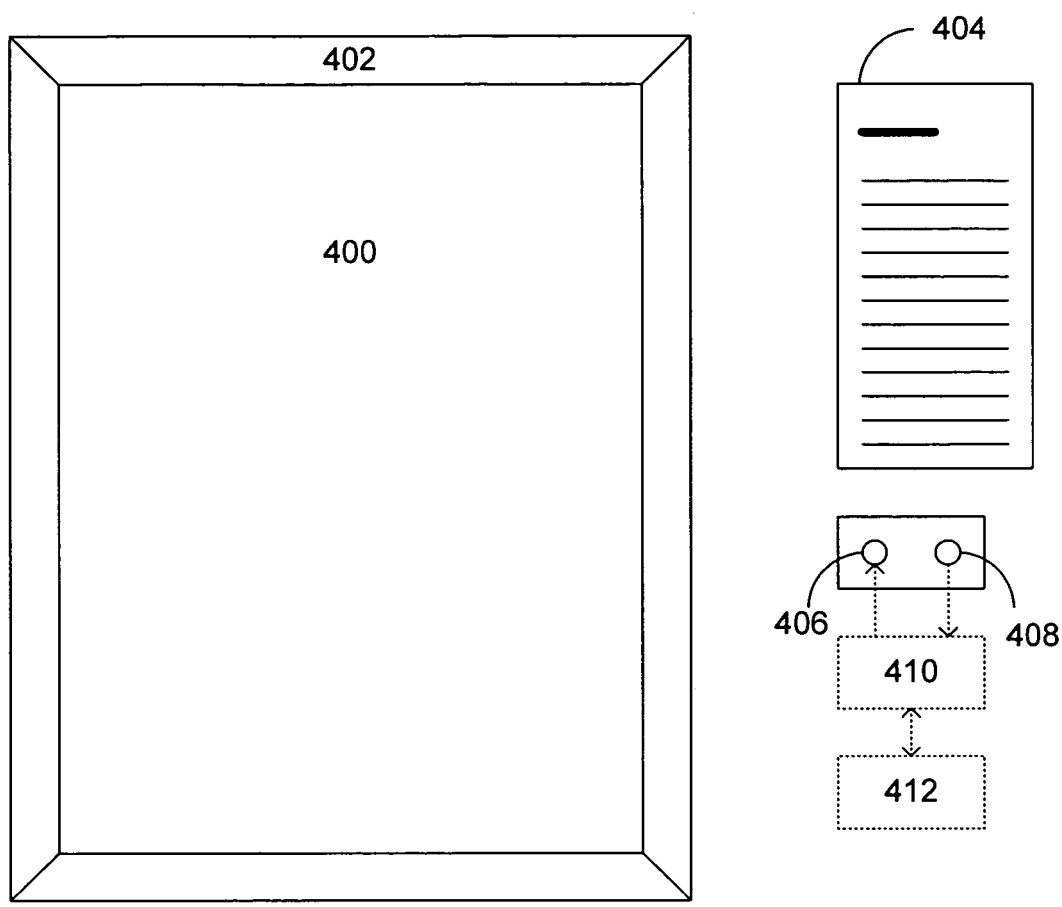
FIG. 4 is a front view of an example museum exhibit including an automatic annotation transmission device according to the present invention.

FIG. 4 is a front view of an example museum exhibit including an automatic annotation transmission device according to the present invention. In this example embodiment of the present invention a museum exhibit includes a painting 400 in a frame 402, along with a descriptive sign 404 and an automatic annotation transmission device. The automatic annotation transmission device comprises a transmitter 406, a receiver 408, a processor 410, and a memory 412. The processor 410 is electrically coupled to the transmitter 406, receiver 408, and memory 412. The memory 412 contains annotation information relative to the painting 400. This annotation information may include the information contained in the descriptive sign 404, or any other information as desired by the museum.

Figure 5:
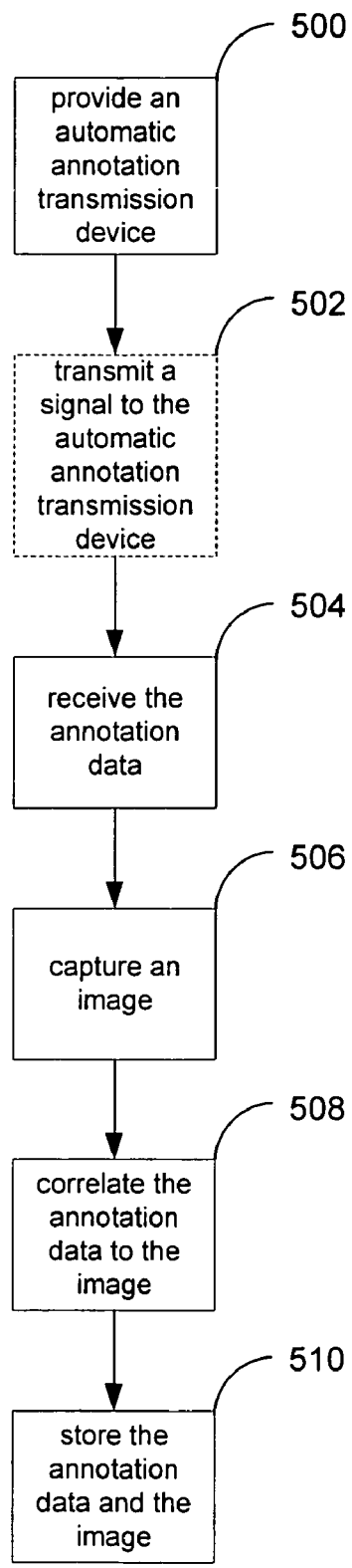
FIG. 5 is a block diagram of an example method for automatically annotating images.

FIG. 5 is a block diagram of an example method for automatically annotating images. In a step 500, provide an automatic annotation transmission device, configured to automatically transmit annotation data related to a nearby photographic subject. In an optional step 502, transmit a signal to the automatic annotation transmission device, wherein said automatic annotation transmission device is configured to begin transmitting annotation data when said signal is received. In a step 504, receive the annotation data. In a step 506, capture an image. In a step 508, correlate the annotation data with the image. In a step 510, store the annotation data and image in a memory.

The foregoing description of the present invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for associating images with annotation data comprising:
- an automatic annotation data transmission device configured to transmit annotation data that is separated into fields, each field being identified as containing a particular category of annotation data;
- an annotation data reception device comprising:
  - a processor;
  - a memory electrically coupled to said processor, configured to store images and said annotation data;
  - a receiver electrically coupled to said processor, configured to receive said annotation data from said automatic annotation data transmission device when an image is captured; and
  - a user interface through which a user controls said processor to only accept designated fields of said annotation data from said automatic annotation data transmission device for storage in said memory and association with a stored image, wherein said processor is configured to associate accepted annotation data with a corresponding image, and
- wherein said automatic annotation data transmission device is specific to a particular location where it is disposed and is configured to transmit annotation data specific to said location.

2. The system of claim 1, wherein said receiver comprises an infrared receiver.

3. The system of claim 1, wherein said receiver comprises an RF receiver.

4. The system of claim 1, wherein said image is a still image.

5. The system of claim 1, wherein said image is a video image.

6. The system of claim 1, further comprising:
- a transmitter electrically coupled to said processor, configured to transmit a signal to said automatic annotation data transmission device when an image is captured.

7. The system of claim 6, wherein said signal causes the automatic annotation data transmission device to begin transmission of said annotation data.

8. The system of claim 1, wherein said annotation data includes a date and time.

9. The system of claim 1, wherein said annotation data includes a location.

10. The system of claim 1, wherein said annotation data includes an identification of a photographic subject at said location.

11. The system of claim 1, wherein said annotation data includes information in more than one language.

12. The system of claim 1, wherein said annotation data includes historical information.

13. The system of claim 1, wherein said automatic annotation data reception device is a digital camera.

* * * * *